United States Patent [19]
Havens et al.

[11] Patent Number: 5,946,383
[45] Date of Patent: Aug. 31, 1999

[54] DYNAMICALLY ASSOCIATING SERVICE SCRIPT LOGICS TO PROVIDE A SUBSCRIBER FEATURE WITHIN AN ADVANCED INTELLIGENT NETWORK

[75] Inventors: Eric Havens, Prosper; Panos Hadjikomninos, Dallas, both of Tex.

[73] Assignee: Ericsson Inc., Research Triangle Park, N.C.

[21] Appl. No.: 08/785,852

[22] Filed: Jan. 21, 1997

[51] Int. Cl.⁶ .................................................... H04M 3/42
[52] U.S. Cl. .......................................... 379/207; 379/215
[58] Field of Search .................................... 379/201, 269, 379/215, 230, 266, 207, 88.24, 88.25

[56] References Cited

U.S. PATENT DOCUMENTS

| | | | |
|---|---|---|---|
| 4,878,240 | 10/1989 | Lin et al. | 379/269 |
| 5,377,186 | 12/1994 | Wegner et al. | 379/211 |
| 5,541,986 | 7/1996 | Hou | 379/201 |
| 5,574,782 | 11/1996 | Baird et al. | 379/220 |
| 5,627,888 | 5/1997 | Croughan-Peeren | 379/266 |

FOREIGN PATENT DOCUMENTS

WO 95/08881  3/1995  WIPO.

*Primary Examiner*—Fan S. Tsang
*Attorney, Agent, or Firm*—Jenkens & Gilchrist, P.C.

[57] ABSTRACT

An index Service Script Logic (SSL) is created within a Service Control Point (SCP) associated with an Intelligent Network (IN) based telecommunications network. The index SSL correlates and maintains a number of IN services with necessary Service Script Logics (SSLs) to provide different subscriber features. Thereafter, each time a particular SSL completes its execution, the control is transferred back to the index SSL to dynamically determine and to invoke the next action. When all of the associated SSLs for a desired IN service are executed, a response is provided back to the requesting service switching point (SSP) by the index SSL to effectuate the desired call treatment.

21 Claims, 5 Drawing Sheets

DYNAMICALLY ASSOCIATING SERVICE SCRIPT LOGICS TO PROVIDE A SUBSCRIBER FEATURE WITHIN AN ADVANCED INTELLIGENT NETWORK

BACKGROUND OF THE INVENTION

1. Technical Field of the Invention

The present invention relates to a telecommunications network and, in particular, to the provision of telecommunications services using service script logics (SSLs) within an Advanced Intelligent Network (AIN) based telecommunications network.

2. Description of Related Art

As stored program-controlled (SPC) switching systems have evolved, a wide variety of useful features have been developed to extend the communication capabilities such systems provide. Such services or features include call forwarding, "800" or toll free services, call screening, etc. Initially, all hardware and software modules required for providing a particular subscriber feature were placed and executed within a particular telecommunications exchange serving the service requesting subscriber terminal. As a result, each time a new subscriber feature or service was introduced, each and every one of the associated telecommunications exchanges inconveniently and inefficiently needed to be serviced and updated to support the service.

With the development and improvement of sophisticated telecommunications applications, the telecommunications industry has adopted the term "intelligent network" (IN) to denote a concept and architecture for providing vendor-independent and network-independent interfaces between the service logic and the transmission and switching system of a multi-enterprise telecommunications network. The goals of the IN are to centralize the service execution in a control node within a telecommunications network in order to provide rapid definition, testing and introduction of new services as well as the modification of existing services. IN also provides greater flexibility in the design and development of new services in a multi-vendor environment with shorter lead time, and standard network interfaces.

The basic concept behind IN is to move the "intelligence" out of each local exchange or Service Switching Point (SSP) and centralize the services providing the intelligence in a Service Control Point (SCP). By utilizing different combinations of basic building blocks, known as Service Independent Blocks (SIBs), a number of different Service Script Logics (SSLs) can be conveniently created. A specific IN service is then further developed and provided to telecommunications subscribers by utilizing one or more of the SSLs. As a result, there are different IN services for providing different subscriber features within an IN based telecommunications network. Because of such a one-to-one mapping relationship between a desired subscriber feature and the effectuating IN service within an SCP, in order to meet the needs of two different subscribers wanting two different functions or features, two different IN services must be developed and maintained. As a result, if there are three SSLs available, six (3!=3×2×1) different IN services could be potentially created. If there are seven different SSLs available, potentially five thousand forty (5040) IN services would need to be developed and maintained to meet the needs of all possible subscriber demands. Thus, the number of services, the overhead, complexity, and maintainability can be appreciated.

Accordingly, there is a need for a mechanism to dynamically combine necessary SSLs during run-time to provide a desired subscriber service without requiring a separate IN service.

SUMMARY OF THE INVENTION

The present invention discloses a method and apparatus for providing a number of subscriber features or services within an Intelligent Network (IN) based telecommunications network wherein different service script logics (SSLs) are dynamically combined during run-time to reduce the number of IN services and to minimize the associated overhead and the complexity of the system. Each service within an IN based telecommunications network is associated with one or more service script logics (SSLs) for providing the desired call treatment. A service control point (SCP) associated with an IN receives an indication from a service switching point (SSP) to effectuate a subscriber service towards a particular call connection. In response to such an indication, the SCP invokes a start SSL to determine the first SSL to execute from the group of SSLs associated with that particular subscriber service. After executing the determined first SSL, a next-action-variable within the executed SSL is set. The control is thereafter transferred to an index SSL. Utilizing the next-action-variable and the data dynamically linking the associated SSLs, the index SSL is able to determine the next action to be performed on the received call connection. Such an action includes identifying and executing the next SSL from the group of SSLs. The next SSL is identified, the control is passed to the identified SSL for execution, and an appropriate next-action-variable is similarly set. Such a recursive action enables the SCP to identify and execute all of the necessary SSLs to effectuate the desired subscriber feature. The next action to be performed by the SCP may also include a completion to an announcement machine. Alternatively, it may also include a completion to another telecommunications terminal.

By executing all of the associated SSLs correlated by the index SSL, the serving SCP provides the desired call treatment toward the received call connection. By introducing a single index SSL to dynamically correlate a number of IN services with their respective SSLs, an undesirable number of separate IN services need not be created and maintained within the serving SCP.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
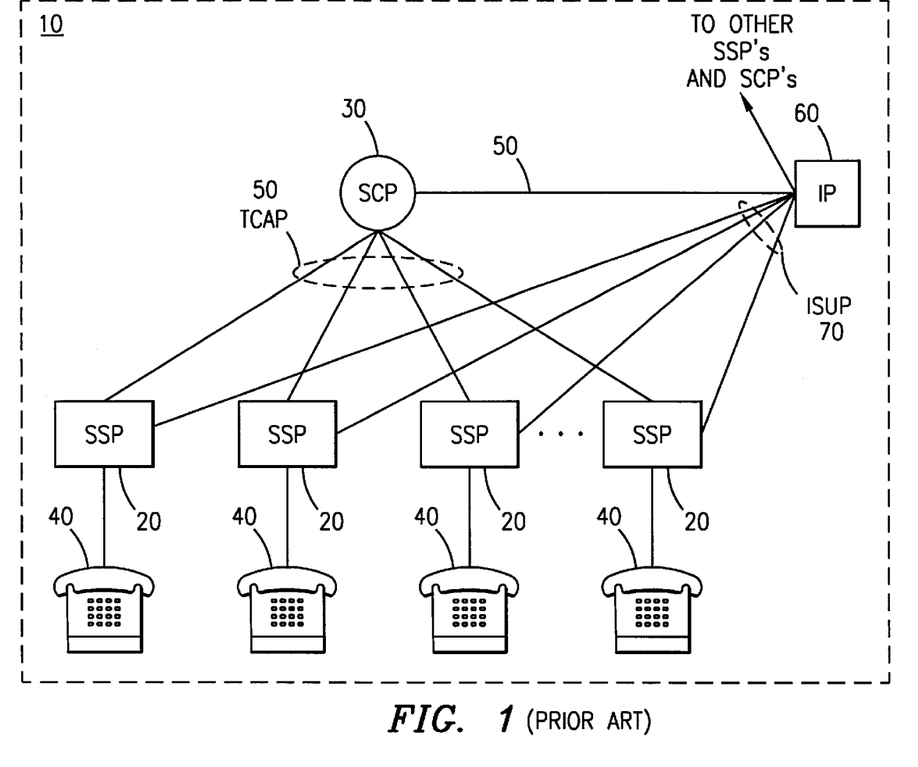
FIG. 1 is a block diagram of a telecommunications network architecture in accordance with the concept of an Intelligent Network (IN)

FIG. 1 shows an Intelligent Network (IN) 10 in which the present invention, as will be disclosed herein, may be implemented. The basic concept behind IN is to move the intelligence out of each local exchange or Service Switching Point (SSP) 20 and centralize the services providing the intelligence in a Service Control Point (SCP) 30. By centralizing the special subscriber services in the SCP 30, a new service can be added in only one place and provided to all subscribers connected to the multiple SSPs 20. Accordingly, one SSP 20 serves multiple telecommunications subscribers or terminals 40, and one SCP 30 serves multiple SSPs 20 or local switches. The interfaces between SSPs 20 are by links 50 utilizing the Signaling System No. 7 (SS7) Transaction Capabilities Application Part (TCAP), or other Signaling Control Connection Part (SCCP) based application layer protocols. More specifically, Intelligent Network Application Protocols (INAP) sit on top of the TCAP protocols to establish a control dialogue between the SSPs 20 and the SCP 30.

Hardware resources required to execute IN services are grouped and located separately from the SSP 20 in an Intelligent Peripheral (IP) 60. The purpose of such a separation is to allow multiple SSPs 20 to share the same resources, to decrease processor load in the SSPs 20 and the SCP 30, and to provide common functionality to all IN services. The resources located in the IP 60 typically include, but are not limited to, announcement machines, speech synthesis, speech recognition, DTMF digit receptor, tone generators, voice mail, modems, e-mail, fax, and other operator resources. The SCP 30 and the IP 60 are also connected via another TCAP or INAP based communications link 60. In order to transport voice and data, the connections 70 between the IP 60 and the SSPs 20 are established using Integrated Service Digital Network (ISDN) User Part (ISUP) signals.

Utilizing the above architecture, an incoming or outgoing call connection is initially received by a serving SSP 20 associated with a particular subscriber terminal 40. Since the SSP 20 has no "intelligence" to determine what kind of call treatment should be applied toward the received call connection, the SSP 20 performs a query requesting call treatment instructions to the associated SCP 30 over the connected TCAP link 50. In response to such a query, the SCP 30 retrieves the relevant subscriber data, ascertains the appropriate subscriber service to be provided, and instructs the IP 60 or the associated SSP 20 to effectuate the desired call treatment.

Figure 2:
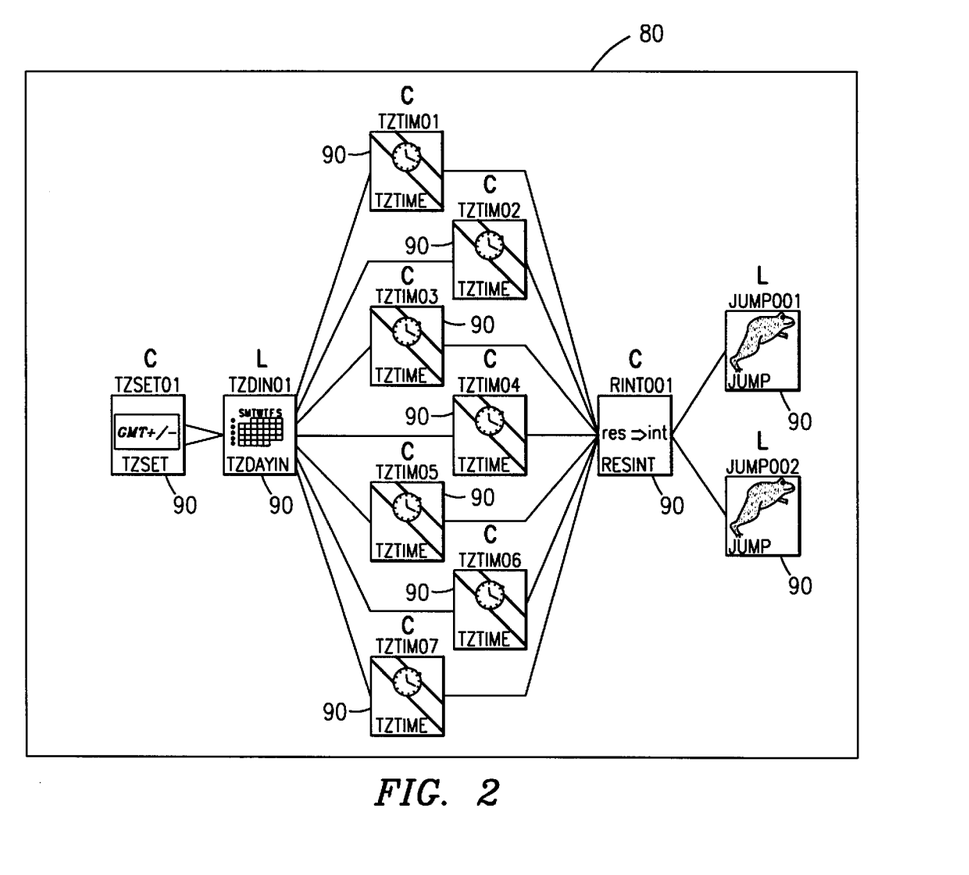
FIG. 2 is a block diagram of a Graphical User Interface (GUI) illustrating a Service Script Logic (SSL) utilizing a number of Service Independent Blocks (SIBs)

FIG. 2 is a block diagram of a graphical illustration known as a Graphical User Interface (GUI) illustrating an association between a Service Script Logic (SSL) 80 with a number of Service Independent Blocks (SIBS) 90. The SCP is associated with a number of basic building blocks or instructions known as Service Independent Blocks (SIBs) 90. Each SIB includes one or more processor executable instructions for performing a particular action. By correlating or linking a number of SIBs 90, a particular procedure or function known as a Service Script Logic (SSL) 80 is created. Different SSLs are then associated and utilized to rapidly develop and deploy new IN services within the IN based telecommunications network. Accordingly, by associating or correlating a number of relevant SSLs with each other, an IN service is formulated and developed to effectuate the desired subscriber feature.

Within a conventional SCP, there typically exists around two to three hundred SIBs. With the help of the graphical user interface (GUI), an operator or service provider can graphically associate multiple SIBs to develop a desired function or SSL. After developing multiple SSLs, by further correlating multiple SSLs, a desired IN service is thereby created and provided to subscribers. As a result, FIG. 2 illustrates a GUI representation of a particular SSL 80 and its association with a number of comprising SIBs 90.

Figure 3:
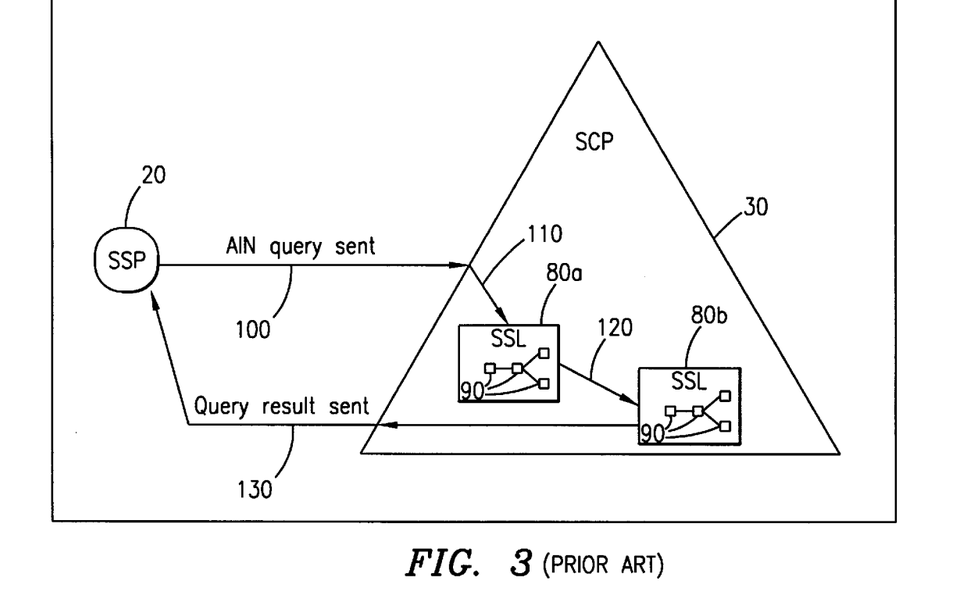
FIG. 3 is a block diagram of an IN illustrating a service control point (SCP) interacting with a service switching point (SSP) to provide a particular IN service via a number of SSLs.

Reference is now made to FIG. 3 illustrating an SCP 30 interacting with an SSP 20 to provide a particular IN service via a number of SSLs 80. As described above, the SSP 20 initially receives an outgoing or incoming call connection. Such a call connection may also include service access, service request, or other non-speech communication from a subscriber terminal. After making a determination that an IN service is associated with the received call connection, the SSP 20 transmits an Advanced Intelligent Network (AIN) query 100 to the associated SCP 30. An access SSL (not shown in FIG. 3) within the SCP 30 then retrieves the relevant subscriber data, such subscriber data associated with either the called party subscriber or calling party subscriber, and determines which IN service is be provided for the received incoming call. After selecting an appropriate IN service to be provided, the access SSL then invokes the first SSL 80a correlated with the selected IN service (signal 110). After the execution of the first SSL 80a, the execution control is then transferred (signal 120) over to the next SSL 80b to further effectuate the desired IN service. For exemplary purposes, only two SSLs are shown correlated with a particular IN service in FIG. 3. However, it is to be understood that any number of needed SSLs may be correlated with a particular IN service.

After the execution of all associated SSLs, a query result 130 is transmitted back to the requesting SSP with necessary instructions to enable the SSP 20 to provide the determined call treatment to the received call connection. Such an instruction may request the SSP 20 to reroute the received incoming call to a different forward-to-number. It may further instruct the SSP 20 to complete the call connection to a voicemail or announcement machine.

Figure 4:
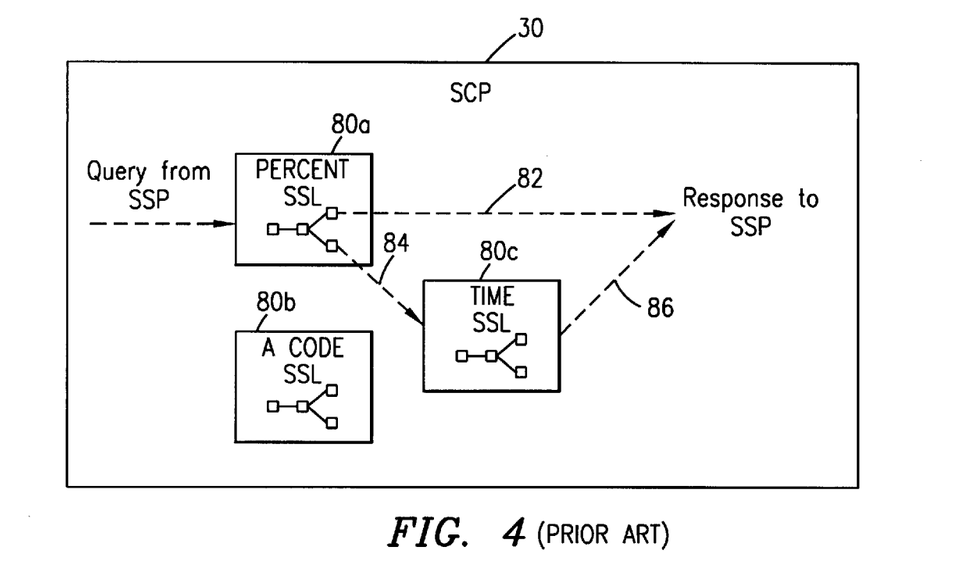
FIG. 4 is a block diagram of a first IN service being effectuated with the execution of two different SSLs.

FIG. 4 is a block diagram of a first IN service being provided with the execution of two different SSLs. For exemplary purposes, the present SCP 30 contains only three SSLs: a Percent SSL 80a for rerouting incoming call connections depending on the traffic load of each forward-to-number; a Area-code (Acode) SSL 80b for processing a query according to the calling party subscriber's area code; and a Time SSL 80c for processing a query according to the time of day.

As an illustration, if a called party subscriber wants to route a half of its incoming calls to a first forward-to-number and the remaining half to particular one of second forward-to-numbers based on the time of day, a query from the SSP is first processed by the Percent SSL 80a. A first incoming call connection is automatically rerouted to the predetermined first forward-to-number. However, the next incoming call connection is rerouted to one of the second forward-to-numbers based on the time of day of the received call connection. For example, if the call is received during business hours, it is forwarded to a particular forward-to-number. On the other hand, if it received during non-business hours, it is instead forwarded to another forward-to-number. Accordingly, based on the maintained statistics, if the received incoming call needs to be forwarded to the first forward-to-number, the Percent SSL 80a directly returns a response 82 back to the requesting SSP with instructions to reroute the received call connection to the specified first forward-to-number. On the other hand, if the received incoming call needs to be forwarded to one of the second forward-to-numbers based on the time of day, the control is then transferred 84 to the Time SSL 80c. Thereafter, the Time SSL 80c evaluates the call connection time associated with the incoming call and determines the appropriate forward-to-number. The determined forward-to-number along with an appropriate instruction is then provided back 86 to the requesting SSP. The SSP, in turn, reroutes the received incoming call. As a result, a first IN service is provided.

Figure 5:
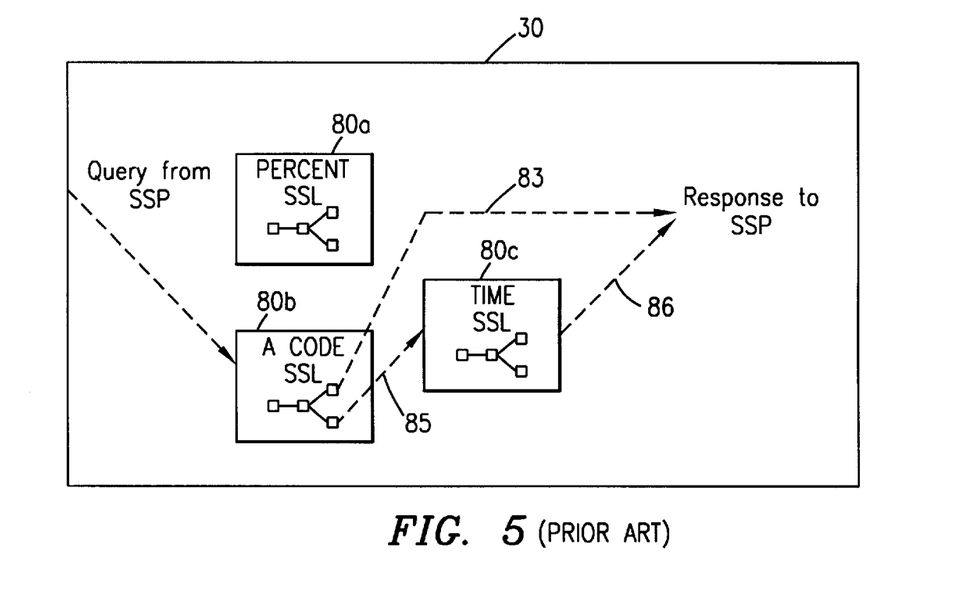
FIG. 5 is a block diagram of a second IN service being effectuated with the execution of two different SSLs.

Reference is now made to FIG. 5. As another illustration of IN service development, if a telecommunications subscriber instead wants to reroute all incoming calls received from one area code to a first forward-to-number, and other incoming calls received from other area codes to one of second forward-to-numbers based on the time of day, a different IN service needs to be introduced. Utilizing a different IN service, the initial query received from the requesting SSP and associated with a particular incoming call connection is first processed by the Acode SSL 80b. The Acode SSL 80b identifies the area code associated with the calling party subscriber, and determines whether the identified area code is same as the one associated with the first forward-to-number. In response to an affirmative determination, the first forward-to-number is provided 83 back to the requesting SSP with instructions to reroute the received incoming call accordingly. On the other hand, if the identified area code does not match, the control is transferred 85 over to the Time SSL 80c. In a similar manner as described above, the Time SSL 80c then ascertains the time of day of the call connection and provides 87 appropriate one of the second forward-to-numbers to the requesting SSP. The receiving incoming call connection is then accordingly rerouted. As a result, a second IN service is provided.

In order to provide the above two different subscriber services, two corresponding IN services must be developed and maintained within the serving SCP. Because of such a one-to-one mapping relationship between a desired subscriber feature and the effectuating IN service, in order to meet the needs of a different number of services or features, the same number of IN services must be created. Since there are three SSLs illustrated in FIGS. 4 and 5, six (permutation of 3) different IN services could potentially be created within the above environment. If the number of SSLs increases to a mere seven, potentially five thousand forty (5040) IN services could be developed and maintained to provide all possible combinations of available SSLs. Accordingly, the number of IN services, the corresponding overhead, the maintainability, and the complexity of the system within a normal SCP can be undesirable and unmanageable.

Figure 6:
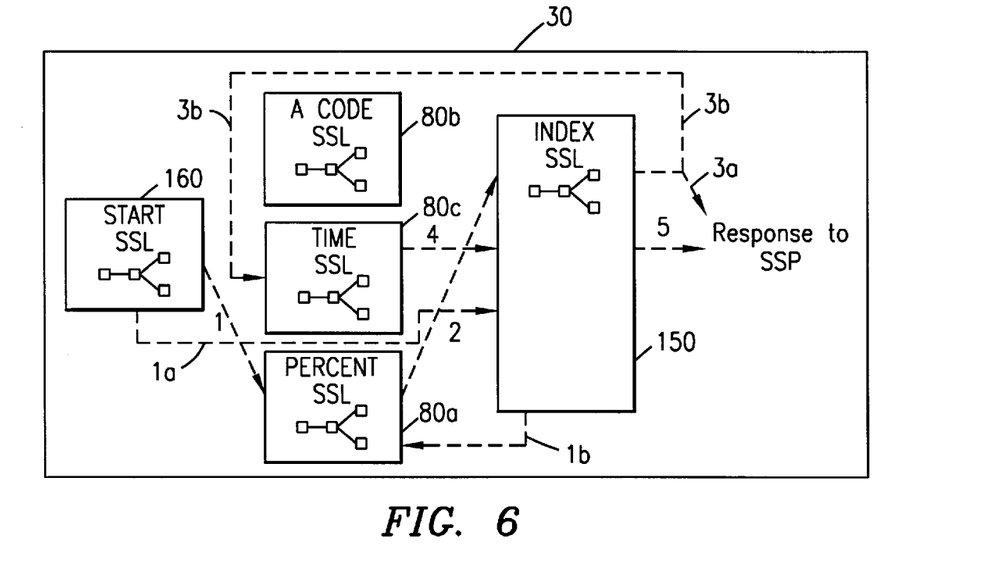
FIG. 6 is a block diagram of a first IN service being effectuated in accordance with the teachings of the present invention.

Reference is now made to FIG. 6 illustrating an IN service being effectuated within an SCP in accordance with the teachings of the present invention. In order to reduce the number of IN services and its corresponding overhead and complexity, a new SSL known as an index SSL is created within the serving SCP 30. The index SSL 150 along with its associated data correlates and maintains a sequence of SSLs to be executed for each IN service being provided by the serving SCP. Accordingly, instead of developing and maintaining a separate IN service for each particular subscriber feature or service in a conventional manner, one single IN service supported by the index SSL 150 flexibly and dynamically provides the same functions or features. As an illustration, in order to provide the same subscriber feature or service as described in FIG. 5, an initial query from the SSP is received by the access SSL (not shown in FIG. 6). Either by evaluating the calling party number or called party number, the access SSL determines which IN service needs to be provided for the receiving incoming call. Thereafter, a Start SSL 160 is invoked. Utilizing the identified IN service, the Start SSL 160 determines the first SSL to be executed from the sequence of SSLs associated with the identified IN service. Such a determination may include executing a number of associated SIBs. After making such a determination and identifying the first SSL to be executed for the particular subscriber service, the Start SSL 160 transfers the control over to the first identified SSL, e.g., Percent SSL 80a (step 1). As another embodiment of the present invention, the Start SSL 160 may also transfer (step 1a) the control over to the Index SSL with the identify of the determined first SSL. The Index SSL may then ascertain the actual address (network or memory address) of the identified SSL and "jump" to the appropriate SSL (step 1b).

After the execution of the first SSL, such as the Percent SSL 80a, instead of jumping to the next SSL directly, a next-action-variable is set by the Percent SSL 80a. The control is then passed back to the Index SSL 150 (step 2). The value of the next-action-variable is set as a result of the internal execution of all associated SIBs for that particular SSL. Utilizing the identity of the determined IN service and the value of the next-action-variable set by the Percent SSL, the Index SSL 150 then determines the current state of the execution and the next action to be performed.

As illustrated above, a half of the incoming calls are rerouted to the first forward-to-number and the rest are rerouted to one of the second forward-to-numbers based on the time of day. Accordingly, if the call needs to be rerouted to the first forward-to-number, the directory number associated with the first forward-to-number is returned to the query SSP (step 3a). On the other hand, if the time of day determination is still needed to be made, by evaluating the next-action-variable, the index SSL 150 identifies and appropriately invokes the next SSL, the Time SSL 80c (step 3b). After the completion of the execution of the Time SSL 80c, a corresponding next-action-variable is further set and the control is again passed back to the Index SSL 150 (step 4). For this particular case, all associated SSLs, the Percent SSL 80a and the Time SSL 80c, for this subscriber service have now been executed and the resulting call treatment instruction is provided back to the SSP (step 5). Such an instruction may enable the SSP to forward the received incoming call to a forward-to-number, to an announcement machine, or to a voicemail system.

Figure 7:
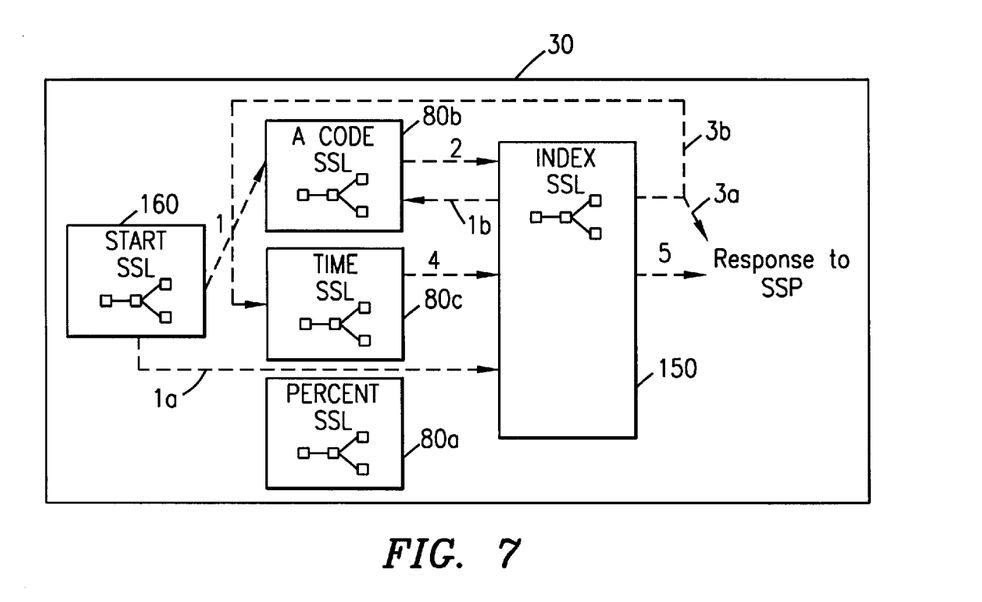
FIG. 7 is a block diagram of a second IN service being effectuated in accordance with the teachings of the present invention.

Reference is now made to FIG. 7. In case the SCP desires to provide a different IN service as described in FIG. 4, instead of creating a separate IN service, the existing Start SSL 160 and the Index SSL 150 are utilized. Data correlating the new service with a new sequence of SSLs are made accessible to the Index SSL 150. Thereafter, whenever the newly developed IN service needs to be provided toward a call connection, the Start SSL 160 again determines the first SSL to be executed from the newly inserted array of SSLs associated with the new IN service. After making such a determination, the determined SSL, such as the Acode SSL 80b, is executed (step 1). As another embodiment of the present invention, the Start SSL 160 may also transfer (step 1a) the control over to the Index SSL with the identity of the determined first SSL. The Index SSL may then ascertain the actual address (network or memory address) of the determined first SSL and "jump" to the appropriate SSL (step 1b).

If the calling party subscriber is associated with a particular area code, the incoming call connection is rerouted to the first forward-to-number. Otherwise, the time of day determination further needs to be made in order to reroute the call connection to one of the second forward-to-numbers. Accordingly, if the area codes match, an appropriate next-action-variable is set and the control is passed to the Index SSL 150 (step 2). By evaluating the next-action-variable along with the identity of the IN service, the Index SSL 150 determines that no additional SSL needs to be executed and provides the first forward-to-number back to the requesting SSP with instruction to reroute the received incoming call (step 3a). Otherwise, the Index SSL 150 identifies and retrieves the next SSL from the array of SSLs associated with the desired IN service and accordingly transfers the control to the Time SSL 80c (step 3b). By evaluating the time of day, the Time SSL 80c then selects one of the second forward-to-numbers to be applied for the received incoming call. The next-action-variable is also appropriately set. The control is then again passed back to the Index SSL 150 (step 4). The Index SSL 150 then realizes that all of the associated SSLs for this particular IN service have been executed and the resulting call treatment instruction is provided to the requesting SSP (step 5). The receiving SSP, in turn, utilizes the provided data to properly provide the desired call treatment to the received incoming call.

By introducing a Start SSL and an Index SSL to correlate a number of different subscriber services with corresponding SSLs, the need for multiple IN services to provide the same number of subscriber features or services has been eliminated. Furthermore, if a new IN service needs to be introduced, data associated with the Index SSL 150 merely need to be modified to reflect the new IN service with desired sequence of SSLs. No new deployment or development of SSLs are needed in a conventional manner.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A system for providing subscriber features to a plurality of subscribers within an Intelligent Network (IN) based telecommunications network, comprising:
    a plurality of procedures wherein each one of said subscriber features associated with one or more of said plurality of procedures;
    a next-action-variable associated with each of said plurality of procedures, said next-action-variable being set by each associated said one or more of said plurality of procedures upon execution of each of said one or more of said plurality of procedures; and
    an index procedure for correlating said one or more of said plurality of procedures with each one of said subscriber features, said index procedure further determining a first procedure for execution from said one ore more of said plurality of procedures associated with a particular subscriber feature, said index procedure further sequentially executing each of said one or more of said plurality of procedures associated with a particular subscriber feature by evaluating said next-action-variable associated with the prior executed procedure to identify a next action for execution in effectuating said subscriber feature.

2. The system of claim 1 further comprising a start procedure for specifying which procedure to be executed first for each one of said subscriber features.

3. The system of claim 1 wherein said next action to be executed includes invoking another procedure associated with said plurality of procedures.

4. The system of claim 1 wherein said next action to be executed includes a completion to an announcement machine.

5. The system of claim 1 wherein said next action to be executed includes a completion to a terminating number.

6. The system of claim 1 further comprising a service control point (SCP) for providing said subscriber features.

7. The system of claim 6 wherein said plurality of procedures comprise a plurality of service script logics (SSLs).

8. The system of claim 7 wherein said index procedure comprises an Index SSL for correlating a particular subscriber feature with one or more of said SSLs.

9. The system of claim 2 wherein said start procedure comprises a start SSL within said SCP for invoking the first SSL associated with a particular subscriber feature.

10. A method for providing a plurality of subscriber services within an Intelligent Network (IN) based telecommunications network, said telecommunications network associated with a telecommunications node including a plurality of procedures wherein each one of said subscriber services is associated with one or more of said plurality of procedures, said method comprising the steps of:
    receiving an indication to effectuate at least one subscriber service of said plurality of subscriber services for a particular subscriber;
    invoking a start procedure, said start procedure further comprising the step of determining a first procedure to be executed from said one or more of said plurality of procedures associated with said service;
    executing said first procedure;
    setting a next-action-variable associated with said executed procedure;
    invoking a control procedure, in response to a termination of said execution, to determine what further action needs to be effectuated by evaluating said next-action-variable; and
    if said further action comprises a next procedure associated with said subscriber service:
    invoking said next procedure; and
    repeating said steps of setting said next-action-variable and invoking said control procedure until no further procedure needs to be executed to effectuate said subscribe service;
    otherwise
        effectuating said determined further action to provide said subscriber service.

11. The method of claim 10 wherein said telecommunications node comprises a Service Control Point (SCP).

12. The method of claim 10 wherein said procedures comprise service script logics (SSLs).

13. The method of claim 12 wherein said control procedure comprises an index SSL.

14. The method of claim 10 wherein said step of effectuating said determined further action further comprises the step of a completion to an announcement machine.

15. The method of claim 10 wherein said step of effectuating said determined further action further comprises the step of a completion to a telecommunications terminal.

16. The method of claim 10 wherein said indication is received from a service switching point (SSP) associated with said telecommunications network.

17. An apparatus for providing a plurality of subscriber features within an Intelligent Network (IN) based telecommunications network, comprising:

a service switching point (SSP) for receiving a call connection over said telecommunications network; and a service control point (SCP) associated with said SSP for providing one or more of said plurality of subscriber features toward said call connection, said SCP further comprising:

a plurality of service independent blocks (SIBs), each of said SIBs further comprising a number of executable instructions;

a plurality of execution service script logics (SSLs), each of said execution SSLs further associated with one or more of said plurality of SIBs;

a start SSL for receiving an indication from said SSP to provide one of said subscriber features towards said call connection, said start SSL executing the first execution SSL from a plurality of execution SSLs associated with said subscriber feature;

an index SSL for associating one or more of said plurality of execution SSLs with each of said plurality of subscriber features, said index SSL further executing each of said plurality of execution SSLs associated with said subscriber feature to provide each of said subscriber features; and a next-action-variable associated with each of said plurality of execution SSLs, said next-action-variable identifying for said index SSL the next execution SSL to execute from said one or more of said plurality of execution SSLs associated with said indicated subscriber feature.

18. The apparatus of claim 17 wherein said index SSL further comprises means for instructing said SSP to provide a particular call treatment to effectuate said indicated subscriber feature.

19. The apparatus of claim 18 wherein said particular call treatment comprises a completion to a telecommunications terminal.

20. The apparatus of claim 18 wherein said particular call treatment comprises a completion to an announcement machine.

21. The apparatus of claim 18 wherein said particular call treatment comprises a completion to voicemail.

* * * * *